United States Patent
Mizumoto

(10) Patent No.: US 9,794,385 B2
(45) Date of Patent: Oct. 17, 2017

(54) MOBILE COMMUNICATION TERMINAL, RECORDING MEDIUM, AND INCOMING CALL CONTROL METHOD

(71) Applicant: KYOCERA CORPORATION, Kyoto (JP)

(72) Inventor: Akira Mizumoto, Nishinomiya (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/387,454

(22) Filed: Dec. 21, 2016

(65) Prior Publication Data

US 2017/0104858 A1  Apr. 13, 2017

Related U.S. Application Data

(63) Continuation of application No. PCT/JP2015/068545, filed on Jun. 26, 2015.

(30) Foreign Application Priority Data

Jun. 26, 2014  (JP) .................................. 2014-131212

(51) Int. Cl.
*G06F 3/041* (2006.01)
*H04M 1/02* (2006.01)
(Continued)

(52) U.S. Cl.
CPC .......... *H04M 1/0266* (2013.01); *G06F 3/044* (2013.01); *G06F 3/0416* (2013.01);
(Continued)

(58) Field of Classification Search
CPC ...... G06F 3/041; G06F 3/0412; G06F 3/0414; G06F 3/0416; G06F 3/044; G06F 3/048;
(Continued)

(56) References Cited

U.S. PATENT DOCUMENTS

2011/0201301 A1*  8/2011  Okada .................. G06F 3/0416
  455/404.1
2014/0104235 A1*  4/2014  Matsuda ........... H04M 1/72519
  345/174
(Continued)

FOREIGN PATENT DOCUMENTS

JP  2011-082724  4/2011

OTHER PUBLICATIONS

International Search Report in International Application No. PCT/JP2015/068545, dated Aug. 11, 2015, in 1 page.
(Continued)

*Primary Examiner* — Duc M Nguyen
(74) *Attorney, Agent, or Firm* — Duane Morris LLP

(57) ABSTRACT

The touch panel is configured to be located on the display and have sensitivity to a touch operation being able to set relatively high or low. The at least one processor is configured to display an object on the display in response to an incoming call, configured to determine whether a touch operation on the object is effective, configured to determine whether a touch operation is performed in a state where the sensitivity of the touch panel is set relatively high, configured to give notice that a first touch operation on the object is effective when the at least one processor determines that the first touch operation is effective and the first touch operation is performed in the first state, and configured to execute a predetermined processing when a predetermined time has passed in a state where the first touch operation continues.

7 Claims, 11 Drawing Sheets

(51) Int. Cl.
    *G06F 3/044*     (2006.01)
    *H04M 1/725*     (2006.01)
    *G06F 3/0481*     (2013.01)
    *G06F 3/0488*     (2013.01)

(52) U.S. Cl.
    CPC ....... *H04M 1/72522* (2013.01); *G06F 3/0481* (2013.01); *G06F 3/0488* (2013.01); *G06F 3/04817* (2013.01); *H04M 2250/22* (2013.01)

(58) Field of Classification Search
    CPC ......... H04M 1/72519; H04M 1/72522; H04M 1/72583; H04M 2250/22
    See application file for complete search history.

(56) References Cited

U.S. PATENT DOCUMENTS

| | | | | |
|---|---|---|---|---|
| 2014/0111430 | A1* | 4/2014 | Shima | G06F 3/044 345/157 |
| 2014/0204045 | A1* | 7/2014 | Komoto | G06F 3/044 345/173 |
| 2014/0340342 | A1* | 11/2014 | Higashibeppu | G06F 3/0416 345/173 |
| 2015/0135080 | A1* | 5/2015 | Ji | G06F 3/0416 715/728 |
| 2016/0366273 | A1* | 12/2016 | Kobayashi | G06F 3/0488 |
| 2017/0060375 | A1* | 3/2017 | Kondo | G06F 3/0488 |
| 2017/0097722 | A1* | 4/2017 | Ogawa | G06F 3/0416 |
| 2017/0097723 | A1* | 4/2017 | Ogawa | G06F 3/0416 |
| 2017/0104858 | A1* | 4/2017 | Mizumoto | H04M 1/0266 |

OTHER PUBLICATIONS

Written Opinion of the International Searching Authority in International Application No. PCT/JP2015/068545, dated Aug. 11, 2015, and Statement of Relevance of Non-English References Cited Therein, in 4 pages.

* cited by examiner

F I G. 1
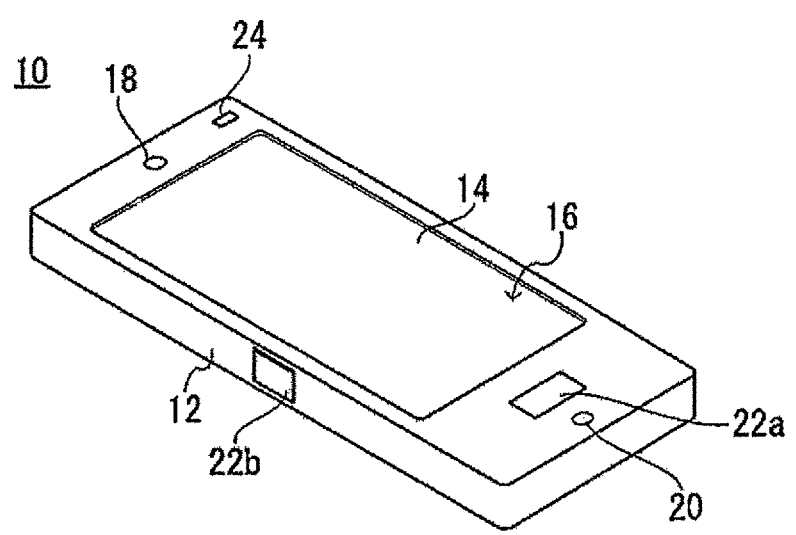

F I G. 2
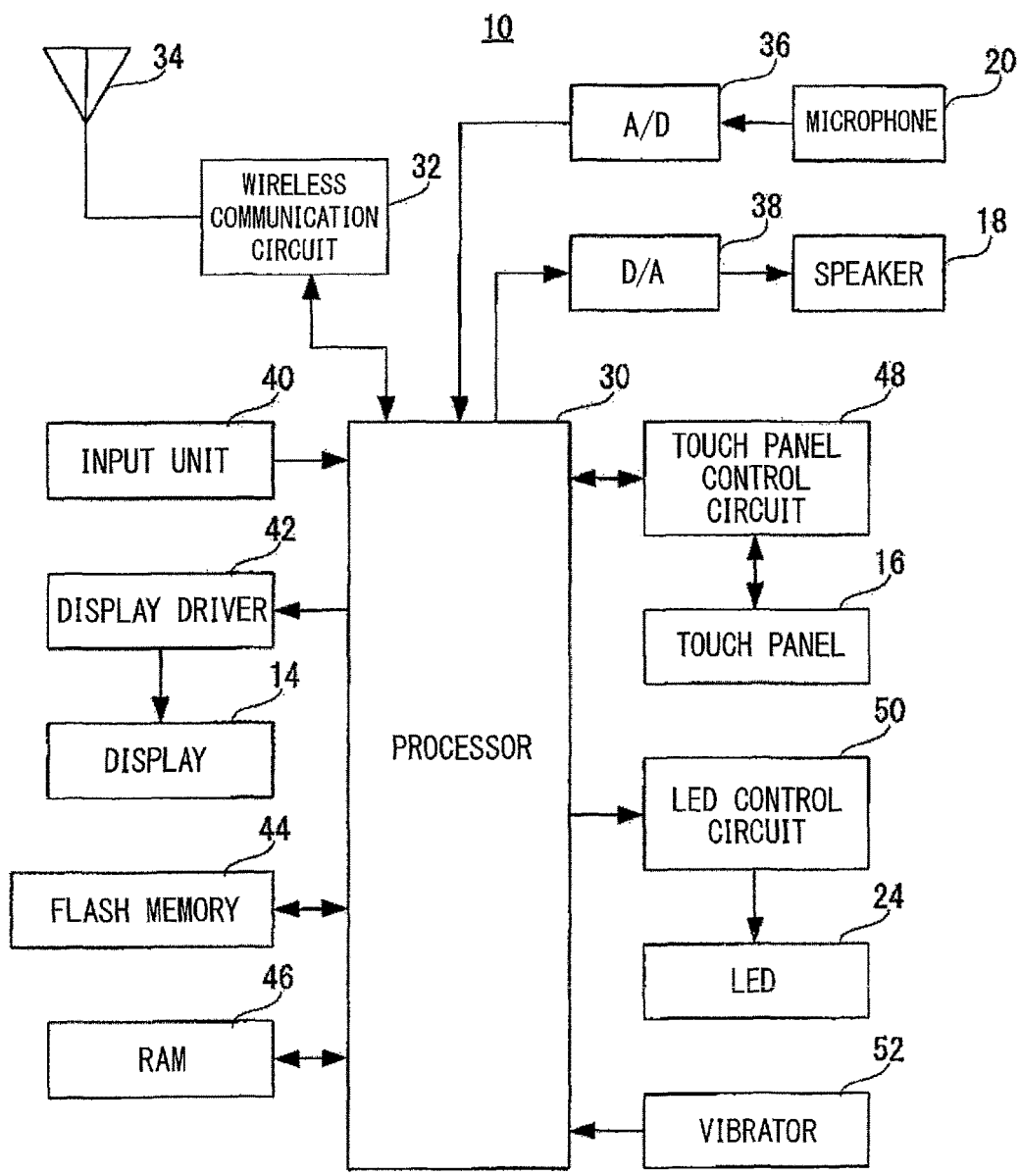

F I G. 1 3
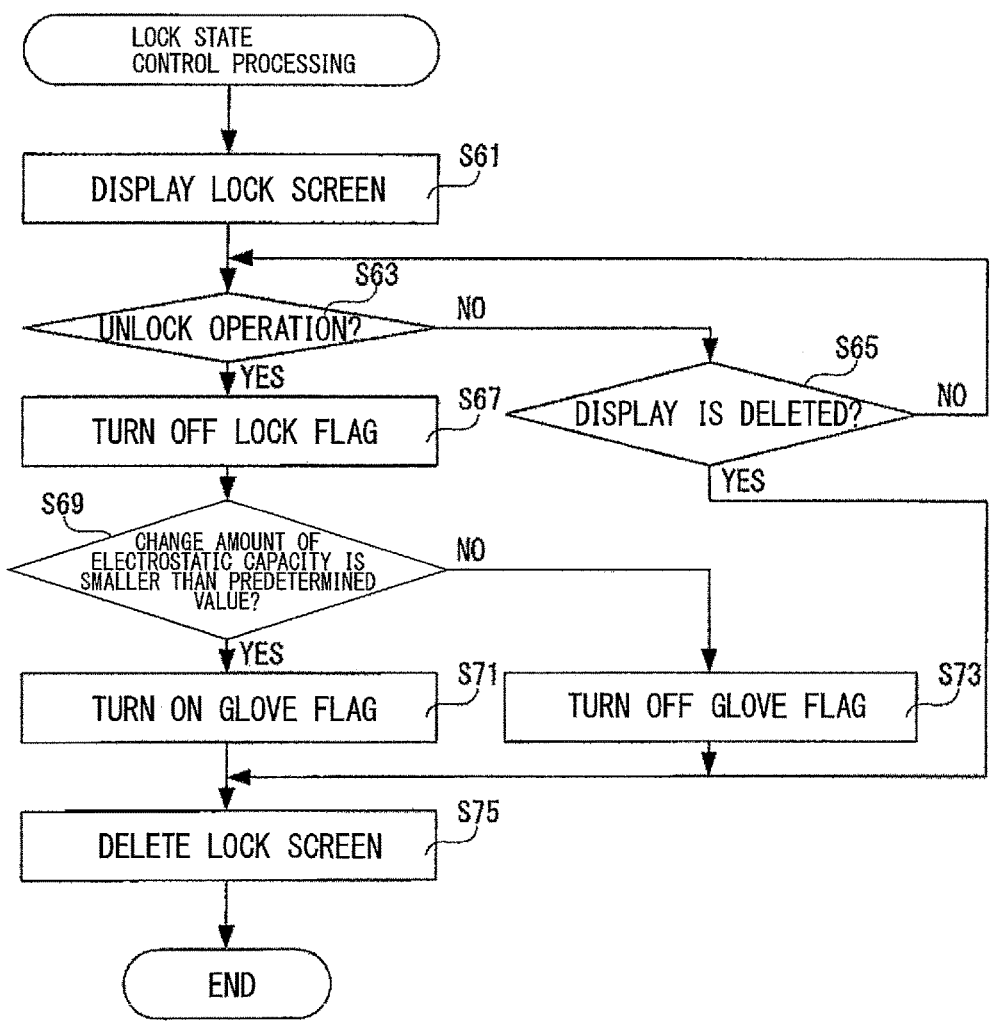

MOBILE COMMUNICATION TERMINAL, RECORDING MEDIUM, AND INCOMING CALL CONTROL METHOD

CROSS-REFERENCE TO RELATED APPLICATION

The present application is a continuation based on PCT Application No. PCT/JP2015/068545, filed on Jun. 26, 2015, which claims the benefit of Japanese Application No. 2014-131212, filed on Jun. 26, 2014. PCT Application No. PCT/JP2015/068545 is entitled "PORTABLE COMMUNICATION TERMINAL, RECORDING MEDIUM, AND INCOMING CALL CONTROL METHOD" and Japanese Application No. 2014-131212 is entitled "MOBILE COMMUNICATION TERMINAL, INCOMING CALL CONTROL PROGRAM, AND INCOMING CALL CONTROL METHOD". The contents of which are incorporated by reference herein in their entirety.

FIELD

Embodiments of the present disclosure relate to a mobile communication terminal.

BACKGROUND

Various techniques are conventionally suggested regarding terminal communication terminals.

SUMMARY

A mobile communication terminal, a recording medium, and an incoming call control method are disclosed. In one embodiment, a mobile communication terminal comprises a display, a touch panel, and at least one processor. The touch panel is configured to be located on the display and have sensitivity to the touch operation being able to set relatively high or low. The at least one processor is configured to display an object on the display in response to an incoming call, configured to determine whether a touch operation on the object is effective, configured to determine whether a touch operation is performed in a first state where the sensitivity of the touch panel is set relatively high, configured to give notice that a first touch operation on the object is effective when the at least one processor determines that the first touch operation is effective and the first touch operation is performed in the first state, and configured to execute a predetermined processing when a predetermined time has passed in a state where the first touch operation continues.

A non-transitory computer readable recording medium stores an incoming call control program. The incoming call control program controls at least one processor of a mobile communication terminal. The mobile communication terminal comprises a display and a touch panel, which is configured to be located on the display and have sensitivity to the touch operation being able to set relatively high or low. The at least one processor executes a display processing step of displaying an object on the display in response to an incoming call. The at least one processor executes a first determination step of determining whether a touch operation on the object is effective. The at least one processor executes a second determination step of determining whether a touch operation is performed in a state where the sensitivity of the touch panel is set relatively high. The at least one processor executes a notification step of giving notice that when it is determined in the first determination step that a touch operation on the object is effective and it is determined in the second determination step that the touch operation is performed in a state where the sensitivity of the touch panel is set relatively high, the touch operation is effective. The at least one processor executes an execution step of executing a predetermined processing when a predetermined time, has passed in a state where the touch operation continues.

An incoming call control method controls at least one processor of a mobile communication terminal. The mobile communication terminal comprise a display and a touch panel, which is configured to be located on the display and have sensitivity to the touch operation being able to set relatively high or low. The at least one processor executes a display processing step of displaying an object on the display in response to an incoming call. The at least one processor executes a first determination step of determining whether the touch operation on the object is effective. The at least one processor executes a second determination step of determining whether the touch operation is performed in a state where the sensitivity of the touch panel is set relatively high. The at least one processor executes a notification step of notifying that, when it is determined in the first determination step that the touch operation on the object is effective and it is determined in the second determination step that the touch operation is performed in a state where the sensitivity of the touch panel is set relatively high, the touch operation is effective. The at least one processor executes an execution step of executing a predetermined processing when a predetermined time has passed in a state where the touch operation continues.

BRIEF DESCRIPTION OF THE DRAWINGS

FIG. 1 is an illustration showing an example of an appearance of a mobile phone.

FIG. 2 is a graphic illustration showing an electrical configuration of the mobile phone.

FIG. 13 is a flow chart showing an example of a lock state control processing of a processor.

DETAILED DESCRIPTION

Figure 3:
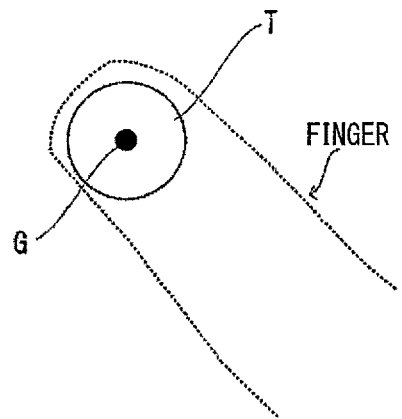
FIG. 3 is a graphic illustration showing an example of a touch position in a touch operation on a touch panel.

A mobile phone 10 shown in FIG. 1 is a smart phone as an example and includes a housing 12 having a verticallylong flat rectangular shape. However, it is mentioned in advance that one embodiment of the present disclosure is applicable to arbitrary mobile communication terminals such as a tablet terminal, a tablet personal computer, and a PDA.

Located in a main surface (front surface) of the housing 12 is a display 14 including for example, liquid crystal or organic EL. A touch panel 16 is located on the display 14.

A speaker 18 is incorporated into one end in a vertical direction of a main surface side of the housing 12. A microphone 20 is incorporated into the other end in the vertical direction of the main surface side of the housing 12.

As hard keys to constitute an input operation means with the touch panel 16, located in the main surface of the housing 12 is a menu key 22a, and provided in a side surface of the housing 12 is a power key 22b.

Provided in a right side of the speaker 18 is an LED 24. However, a light emitting unit of the LED 24 is provided to be exposed from the housing 12, and another part is incorporated into the housing 12.

Figure 4:
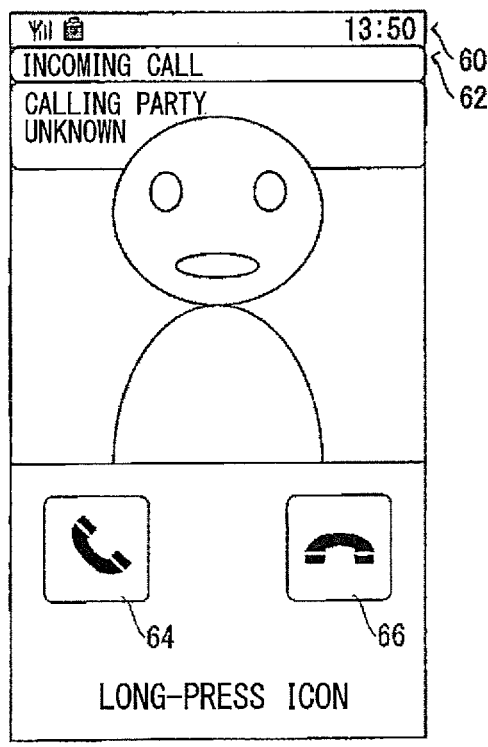
FIG. 4 is a graphic illustration showing an example of an incoming call screen displayed on a display.

For example, a user may input a telephone number via a touch operation on a dial pad displayed on the display 14 and in the same manner, start voice call via a touch operation on the incoming call key 64 displayed on the display 14 (refer to FIG. 4). When the voice call starts; the display 14 displays a hang-up key, and the voice call finishes when a touch operation is performed on the hang-up key.

A home screen is displayed on the display 14 when an operation is performed on the menu key 22a. In this state, the user may select an icon and a key, for example, by performing the touch operation on a GUI (graphical user interface) such as the icon and the key displayed on the display 14 via the touch operation and may determine the selection.

The user may turn on and off a power source of the mobile phone 10 via a long press of the power key 22b. A power source of the display 14 and the touch panel 16 is turned off when a short press is performed on the power key 22b in a state where the display 14 displays the screen.

In the description below, the GUI such as the icon and a softkey displayed on the display 14 is collectively referred to as an object in some cases.

Herein, the touch operation indicates an operation including a touch (contact) to a surface of the touch panel 16 with a finger. The touch operation includes a tap operation, a long-tap operation, a flick operation, a swipe (slide) operation, and the like.

The tap operation indicates an operation to take the finger off (release the finger from) the surface of the touch panel 16 within a short time after bringing the finger into contact with (causing the finger to touch) the surface, of the touch panel 16. The long-tap operation indicates an operation to take the finger off the surface of the touch panel 16 after keeping the finger in contact with the surface of the touch panel 16 for a determination time or more. The flick operation indicates an operation to bring the finger in contact with the surface of the touch panel 16 and then flick the finger in an arbitrary direction at a predetermined speed or more. The swipe (slide) operation indicates an operation to move the finger in an arbitrary direction while keeping the finger in contact with the surface of the touch panel 16 and then takes the finger off the surface of the touch panel 16.

The above swipe operation includes a swipe operation to bring the finger into contact with an object displayed on the surface of the display 14 and then moves the object, a so-called drag operation. An operation to take the finger off the surface of the touch panel 16 after the drag operation is referred to a drop operation.

In the description below, the term "operation" may be omitted from each term of the tap operation, the long-tap operation, the flick operation, the swipe operation, the drag operation, and the drop operation. The touch operation may be performed not only by the finger of the user but also by a stylus pen or the like.

With reference to FIG. 2, the mobile phone 10 shown in FIG. 1 includes a processor 30. The processor 30 is called a computer or a CPU or the like. A wireless communication circuit 32, an A/D converter 36, a D/A converter 38, an input unit 40, a display driver 42, a flash memory 44, a RAM 46, a touch panel control circuit 48, an LED control circuit 50, a vibrator 52, and the like are connected to the processor 30.

The processor 30 can control the entire mobile phone 10. In using an entire or part of the program which is preset in the flash memory 44, the entire or part of program is developed in the RAM 46 which is a memory, and the processor 30 can operate in accordance with the program in the RAM 46. The RAM 46 is further used as a working region or a buffer region of the processor 30. The flash memory 44 and the RAM 46 may be thought of as a non-transitory computer readable recording medium.

The input unit 40 includes a hard key 22a, 22b shown in FIG. 1. Accordingly, the input unit 40 can receive a key operation on the hard key. Upon receipt of an input operation on the hard key, the input unit 40 can input information (a key data) of the hard key to the processor 30.

The wireless communication circuit 32 is a circuit to transmit and receive radio waves for the voice call, an E-mail, or the like via an antenna 34. The wireless communication circuit 32 is a circuit for a wireless communication in CDMA system, for example. For example, the wireless communication circuit 32 executes, based on the operation to instruct a call request (voice transmission) received by the touch panel 16, a voice transmission processing in accordance with an instruction of the processor 30 and then outputs a voice transmission signal via the antenna 34. The voice transmission signal is transmitted to another person's telephone through a base station and a communication network. Upon completion of a voice reception processing in another person's telephone, a communication-enabled state is established, and the processor 30 executes a call processing.

The microphone 20 shown in FIG. 1 is connected to the A/D converter 36. An analog voice signal obtained from the microphone 20 as described above is converted into a digital voice data in the A/D converter 36, and the voice data is input to the processor 30. The microphone 18 shown in FIG. 1 is connected to the D/A converter 38. The D/A converter 38 can convert the digital voice data into an analog voice signal and then provide the voice signal to the speaker 18 via an amplifier. Accordingly, a voice based on the voice data is output from the speaker 18. In a state where the call processing is executed, a voice collected by the microphone 20 is transmitted to another person's telephone, and a voice collected by another person's telephone is output from the speaker 18.

The display 14 shown in FIG. 1 is connected to the display driver 42. Accordingly, the display 14 can display a video or an image in accordance with a video data or an image data output from the processor 30. The display driver 42 includes a video memory to temporarily store the data to be displayed. The video memory stores the data output from the processor 30. The display driver 42 can display the image on the display 14 in accordance with contents of the video memory. That is to say, the display driver 42 can control the display of the display 14, which is connected to the display driver 42, in accordance with the instruction of the processor 30. The display 14 is provided with a backlight, and the display driver 42 can control a brightness and lighting/extinction of the backlight in accordance with the instruction of the processor 30.

The touch panel 16 shown in FIG. 1 is connected to the touch panel control circuit 48. The touch panel control circuit 48 can provide voltage necessary for the touch panel 16, for example, and input a touch start signal indicative of a start of the touch to the touch panel 16, an end signal indicative of an end of the touch to the touch panel 16, and a coordinate data indicative of a touch position touched in the touch panel 16 to the processor 30. Accordingly, the processor 30 can determine touched object based on the coordinate data and a variation of the coordinate data.

With reference to FIG. 3, when the touch panel 16 is touched, for example, a touch region T is detected by the touch panel 16. At this time, the touch panel control circuit 48 determines a gravity center G of the touch region T as the touch position and then inputs a coordinate of the gravity center G to the processor 30. That is to say, the gravity center G of the touch region T in the touch operation indicates a start position or end position of a touch or a current touch position. However, a position where the finger, for example, touches in the touch panel 16 first may also be determined to be the touch position instead of the gravity center G.

Returning to FIG. 2, the touch panel 16 may be an electrostatic capacitive touch panel to detect a change of electrostatic capacity generated between a surface of the touch panel 16 and an object such as a finger (referred to as the finger for convenience). The touch panel 16 can detect one or a plurality of fingers touching the touch panel 16. Accordingly, the user performs the touch operation on the surface of the touch panel 16, thereby being able to input an operational position, an operational direction, and the like to the mobile phone 10. Thus, the touch panel 16 is also referred to as a pointing device.

The touch panel control circuit 48 can also detect a change amount of the electrostatic capacity in the touch operation on the touch panel 16. A glove mode which enables a detection of the touch with a gloved hand can be set in the touch panel 16. In particular, the mode is automatically set in accordance with the change amount of the electrostatic capacity in the first touch when the touch operation is started. For example, when the change amount of the electrostatic capacity is smaller than a threshold value (a first threshold value), it is determined that the touch panel 16 is touched with the glove on, so that a setting value for determining that the touch panel 16 is touched is set smaller than a normal setting value. A state where the setting value for determining that the touch panel 16 is touched is set smaller than the normal setting value is referred to as the glove mode. In contrast, a state where the setting value for determining that the touch panel 16 is touched is set to the normal setting value is referred to as a normal mode. Since the touch (the simple contact) is easily detected in the glove mode, the touch operation such as the tap operation is easily detected. When the change amount of the electrostatic capacity detected in the touch panel control circuit 48 is larger than the setting value for determining that the touch panel 16 is touched, the processor 30 determines that the touch panel 16 is touched. When the setting value for determining that the touch panel 16 is touched in the glove mode is referred to as "a second threshold value" and the setting value for determining that the touch panel 16 is touched in the normal mode is referred to as "a third threshold value", the second threshold value<the first threshold value<the third threshold value is established.

Sensitivity to the touch operation is set higher in the glove mode compared with the normal mode. The sensitivity to the touch operation is set lower in the normal mode compared with the glove mode.

Although the processor 30 determines whether the change amount of the electrostatic capacity in the touch operation is larger than the setting value for determining that the touch panel 16 is touched, the touch panel control circuit 48 may also perform the determination.

In the mobile phone 10, the power source of the display 14 and the touch panel 16 is automatically turned off when the mobile phone 10 has not been operated for a predetermined length of time (15 seconds, for example).

The LED control circuit 50 can control a light intensity, a color, and a light-emitting cycle (timing) of the LED 24 connected to the LED control circuit 50 in accordance with the instruction of the processor 30. For example, the LED control circuit 50 causes the LED 24 to emit the light of a predetermined color on a predetermined cycle upon receipt of the incoming call. Although not shown in the illustrations, an LED for a key backlight and an LED for a display backlight are also connected to the LED control circuit 50.

The vibrator 52 is a motor in which an eccentric weight is attached to a rotation shaft, and the processor 30 controls an ON/OFF of the vibrator 52. When the vibrator 52 operates (the vibrator is ON), the mobile phone 10 is also vibrated in accordance with a vibration of the vibrator 52. For example, the vibrator 52 is caused to operate upon receipt of the incoming call, thereby enabling to notify the user of the incoming call. The vibrator 52 is caused to operate upon the touch operation, thereby providing feedback on the touch operation to the user.

The mobile phone 10 enables a setting of a lock state to restrict an execution of a predetermined processing based on the touch operation so that a possibility of erroneous operation caused by an input, which is not intended by the user, to the touch panel 16 may be reduced. For example, when the power key 22b is operated, the power source of the display 14 and the touch panel 16 is turned off and the lock state is set. When the menu key 22a is operated in this state, the power source of the display 14 and the touch panel 16 is turned on, and then the processor 30 displays a lock screen. Accordingly, an operation to unlock the lock state can be rendered to be received. However, the lock state is set also when the power source of the display 14 is automatically turned off. In the lock state, the power source of the display 14 and the touch panel 16 is OFF until the lock screen is displayed, so that a power consumption of the mobile phone 10 may be suppressed.

In the state where the lock state is set, the user may perform the operation to unlock the lock state on the lock screen to display the home screen. When the lock screen is displayed or an incoming call screen is displayed in the lock state, the sensitivity to the touch operation is set relatively high. The reason is that it needs to be determined whether the user performs the touch operation with the glove on. Accordingly, even when the user displays the lock screen, for example, with the glove on, the operation to unlock the lock state can be received.

FIG. 4 is a graphic illustration showing an example of an incoming call screen displayed during the incoming call. With reference to FIG. 4, a display range of the display 14 includes a state display region 60 and a function display region 62. The state display region 60 displays a pictogram indicating a radio wave reception state of the antenna 34, a pictogram indicating a remaining battery level of a secondary battery, and a time. The function display region 62 displays the incoming call screen. The incoming call screen includes a character string indicating the arrival of the incoming call, a character string and image indicating a calling party, two keys and character string for explaining an operation to answer the telephone, and the like.

The character string and image indicating the calling party are displayed based on an address data, which includes a name and image of a party (a calling party), when the address data is registered in association with a telephone number of a telephone of the party. When such an address data is not registered, the incoming call screen displays "calling party unknown" and an image indicating that the calling party is unknown.

The two keys to answer the telephone include an incoming call key 64 and a hold key 66. When the long-tap operation is performed on the incoming call key 64 during the incoming call, the communication-enabled state is established, and the processor 30 executes the call processing. That is to say, the user may perform the touch operation on the incoming call key 64 to start a telephone communication with the calling party. When the long-tap operation is performed on the hold key 66 during the incoming call, an incoming call-enabled state is established, and the processor 30 executes a holding processing. Upon execution of the holding processing, a voice message notifying the calling party that the user cannot answer the incoming call, for example, is transmitted to the telephone of the calling party. That is to say, the user may perform the touch operation on the hold key 66 to notify the calling party that the user cannot answer the incoming call.

Figure 5:
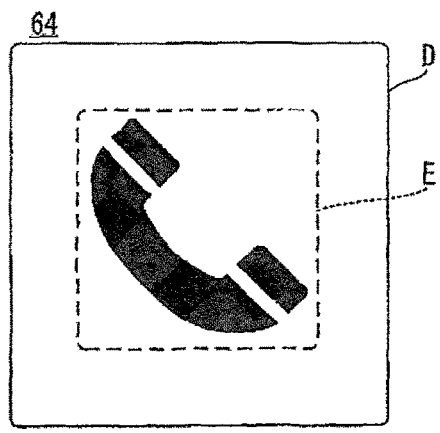
FIG. 5 is a graphic illustration showing an example of a display range and effective range of an incoming call key.

FIG. 5 is a graphic illustration showing a display range D and an effective range E in the incoming call key 64. With reference to FIG. 5, the display range D in which the image of the incoming call key 64 is displayed and the effective range E for receiving the touch operation are associated with the incoming call key 64. Upon the touch operation, when the effective range E does not include the touch position, that is to say, the gravity center G of the touch region T, it is determined that the touch operation is not effective. That is to say, when the touch operation is performed on the incoming call key 64, the touch operation needs to be performed so that the touch position is located within the effective range E.

The determination whether the touch operation is performed on the object is performed based on the touch position where the finger is released. That is to say, when the effective range E of the object includes the touch position where the finger is released, a processing corresponding to the object is executed. However, the determination whether the touch operation is performed on the object may also be performed based on a first touch position.

Since a display range D and effective range E of the hold key 66 has substantially the same configuration with the incoming call key 64, a detailed description is omitted.

The display range D and the effective range E may have the same size with each other. The effective range E may be larger than the display range D. A shape of the display range D and a shape of the effective range E need not be in similarity relation with each other.

Herein, when the gloved finger performs the key operation, substantially a whole of the operated key is covered with the gloved finger, so that the user may not be sure whether the user can perform the touch operation on a correct position, that is to say, whether the user can perform the effective touch operation in some cases. In particular, when the long-tap operation is performed on the key such as the incoming call key 64, it takes time to receive the long-tap operation performed on the key, so that the user may not determine whether his/her long-tap operation is effective until a period of time required as the long-tap operation elapses.

Thus, when the long-tap operation which is effective in the state where the glove mode is set is performed, a notice that the long-tap operation is effective is provided. In contrast, when the long-tap operation which is not effective in the state where the glove mode is set is performed, a notice that the long-tap operation is not effective is provided.

Figure 6:
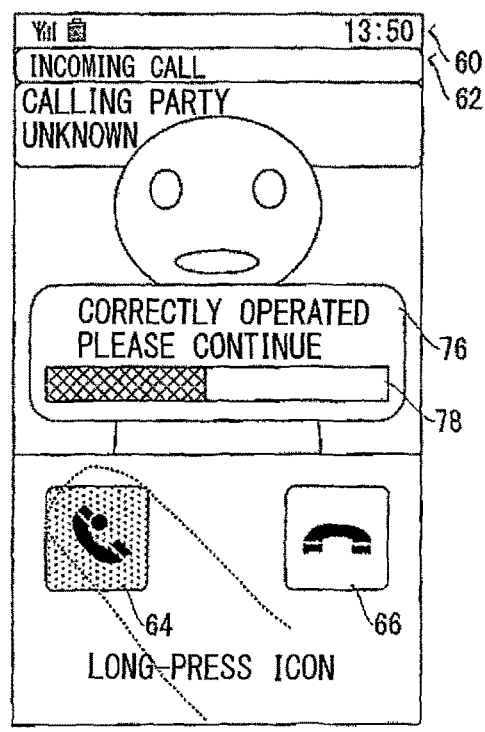
FIG. 6 is a graphic illustration showing an example of a state where an effective touch operation is performed on the incoming call key.
Figure 7:
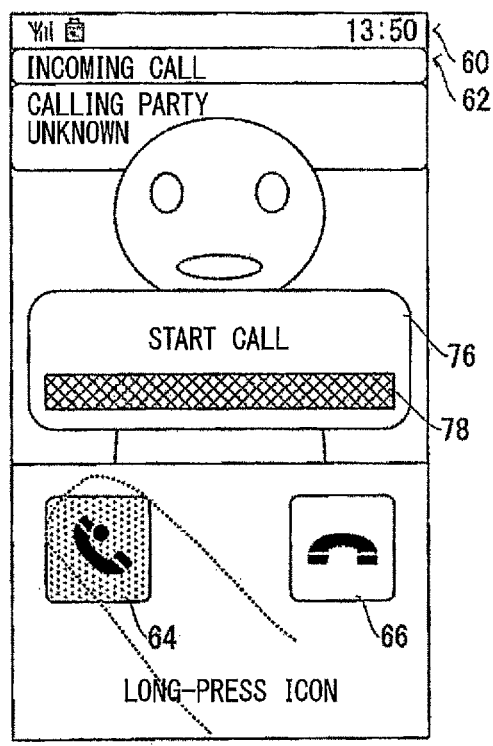
FIG. 7 is a graphic illustration showing an example of a state where an effective touch operation is performed on the incoming call key.

Specifically, when the long-tap operation is performed, it is determined whether the effective range E of the key includes the touch position. For example, when the touch operation is performed, it is determined whether the effective ranges E of the incoming call key 64 and the hold key 66 include the touch position. Herein, when the effective range E of the incoming call key 64 includes the touch position of the touch operation and the sensitivity of the touch panel 16 is set relatively high, the notice that the long-tap operation is effective is provided. As shown in FIG. 6 and FIG. 7, a color of the incoming call key 64 changes, and the display 14 displays a pop-up 76 including a message to notify that the touch operation is effective, so that the notice that the touch operation is effective is provided.

The pop-up 76 displays a time icon 78 indicating a time of performing the long-tap operation and a remaining time required as the long-tap operation. A length of the time icon 78 in a lateral direction indicates a time required as the long-tap operation. A change in a color of the time icon 78 indicates an elapse of the time in continuing the touch operation. A length of part where the color does not change in the time icon 78 in the lateral direction indicates a remaining time required as the long-tap operation. When the color of the whole time icon 78 changes as shown in FIG. 7, it is determined that the touch operation is continued for a certain period of time required as the long-tap operation, and then the pop-up 76 displays a message notifying that a predetermined processing corresponding to the key is executed.

Accordingly, when the user performs the long-tap operation with the gloved hand, the user can recognize whether the touch operation is effective at a time of starting the long-tap operation. Thus, the user can continue the touch operation at ease. Since the time icon 78 gives notice of the time of continuing the long-tap operation, the user can also understand the remaining time for which the long-tap operation should be continued appropriately. Since the above notices are provided using the pop-up 76, the user can recognize that his/her touch operation is effective by just seeing the display 14.

Figure 8:
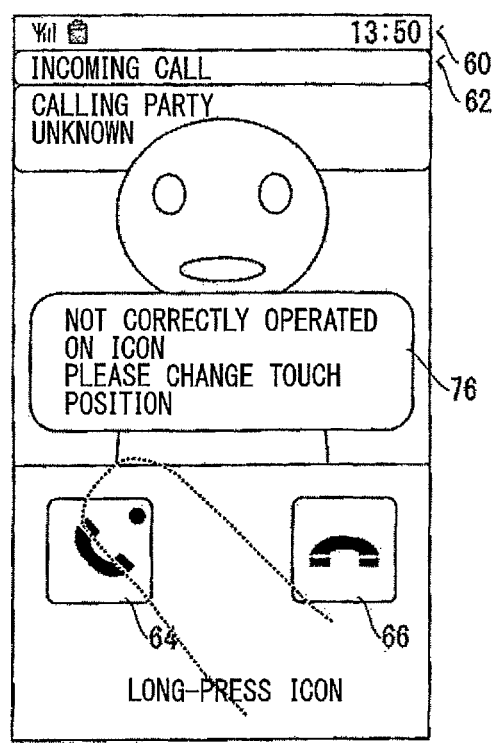
FIG. 8 is a graphic illustration showing an example of a state where an ineffective touch operation is performed on the incoming call key.

Subsequently, when the effective touch operation is not performed, that is to say, when the touch position is not located within the effective range E of the key but located within the display range D of the key, the pop-up 76 which includes a message to notify that the touch operation is not effective is displayed as shown in FIG. 8. Accordingly, the user can recognize immediately that his/her touch operation is not effective, so that the user can correct the touch position in the touch operation to an appropriate position.

When the touch position is not located within the display range D, the display 14 does not display the pop-up 76. However, the user may be notified that the touch operation is not performed on a correct position.

The user may be notified so that the touch position is corrected. Specifically, a vector of a center of the effective range E and the touch position is obtained, and a direction in which the touch position should be moved to be located within the effective range E is determined based on the vector. Then, the pop-up 76 displays a message for indicating the determined direction.

It is also applicable to give notice, using at least one of the LED 24 and the vibrator 52, whether the touch operation is effective. For example, the processor 30 causes the LED 24 to emit a green light at the time of the effective touch operation, and causes the LED 24 to emit a red light at the time of the ineffective touch operation. The processor 30 blinks the LED 24 when causing the LED 24 to emit the green light, and causes the vibrator 52 to operate in accordance with the blinking of the LED 24. A blinking cycle is changed with the elapse of time, so that the notice of the elapse of time from the start of the long-tap operation is also provided. That is to say, the usage of the LED 24 and the vibrator 52 allows the user to intuitively recognize the time of continuing the long-tap operation.

The message displayed by the pop-up 76 may be output by voice. Moreover, it is applicable to display or not to display the pop-up 76 when the message is output by voice. Furthermore, a time of continuing the touch operation may be indicated in numerical form instead of the time icon 78. When the time is indicated in numerical form, the elapsed time may be indicated, or the remaining time may indicated.

It is also applicable to give notice that the touch operation is effective, notice of the continuing the touch operation, and the like by an appropriate combination of the pop-up 76, the voice, the light emission of the LED 24, and the vibration of the vibrator 52, for example.

Figure 10:
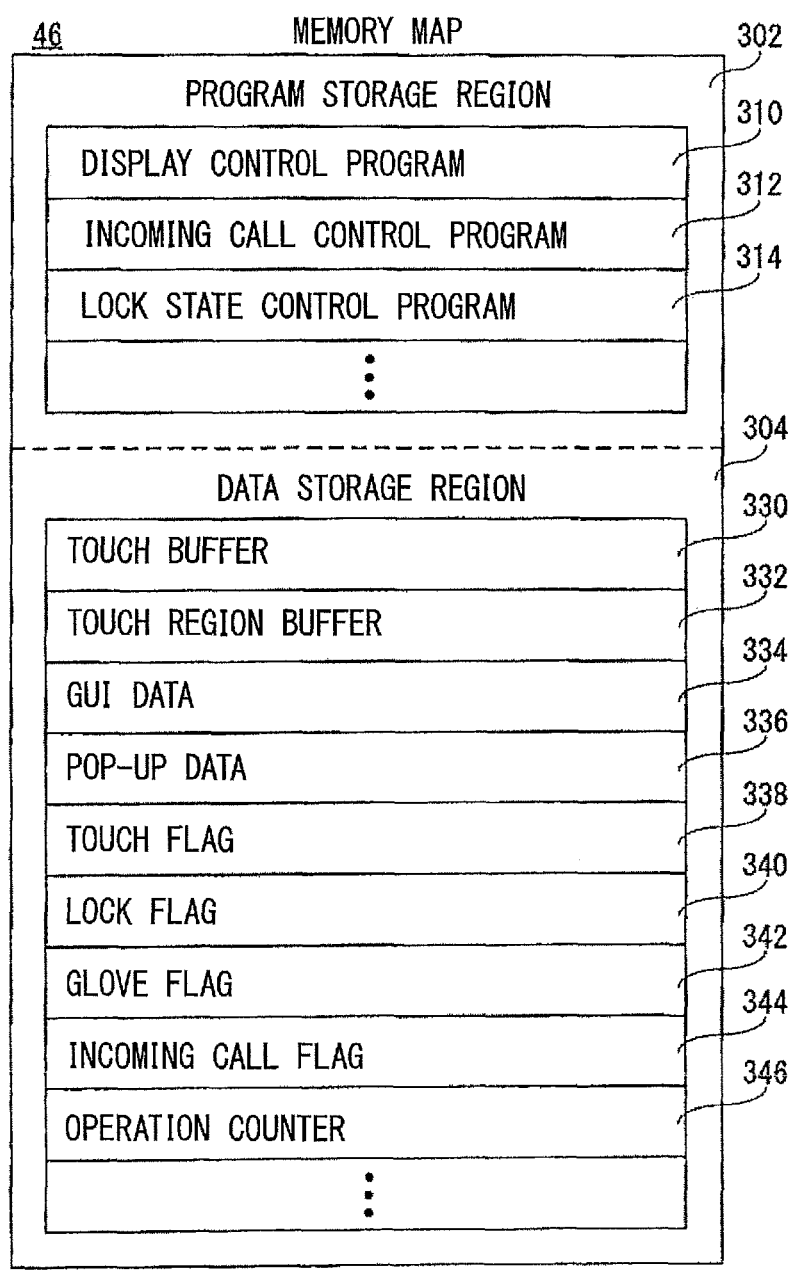
FIG. 10 is a graphic illustration showing an example of a memory map of a RAM.
Figure 11:
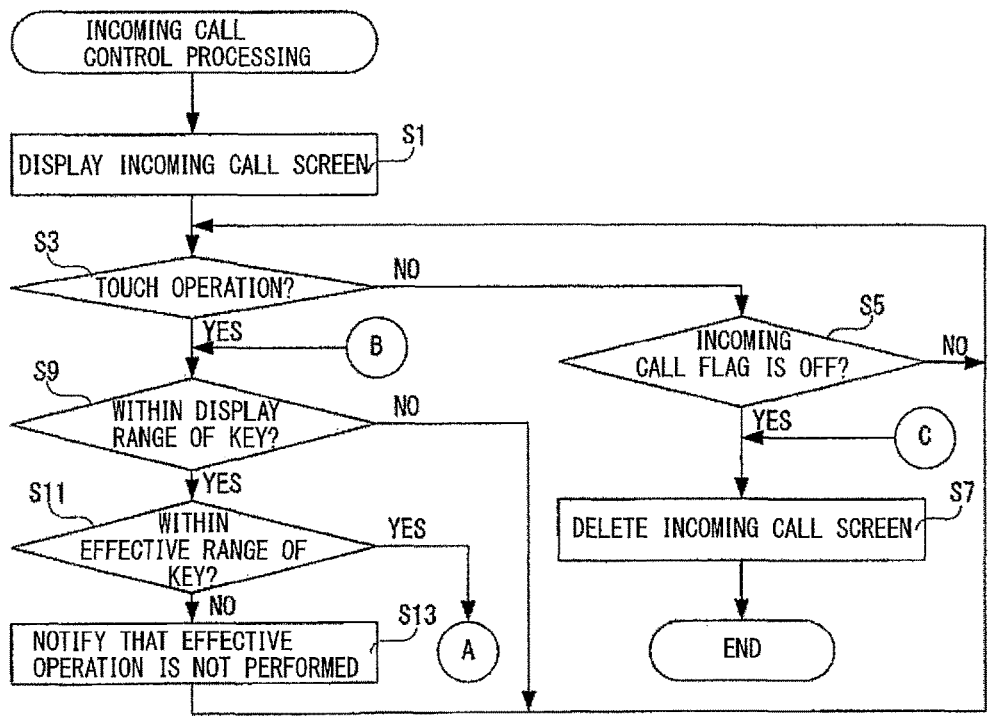
FIG. 11 is a flow chart showing an example of an incoming call control processing of a processor.
Figure 12:
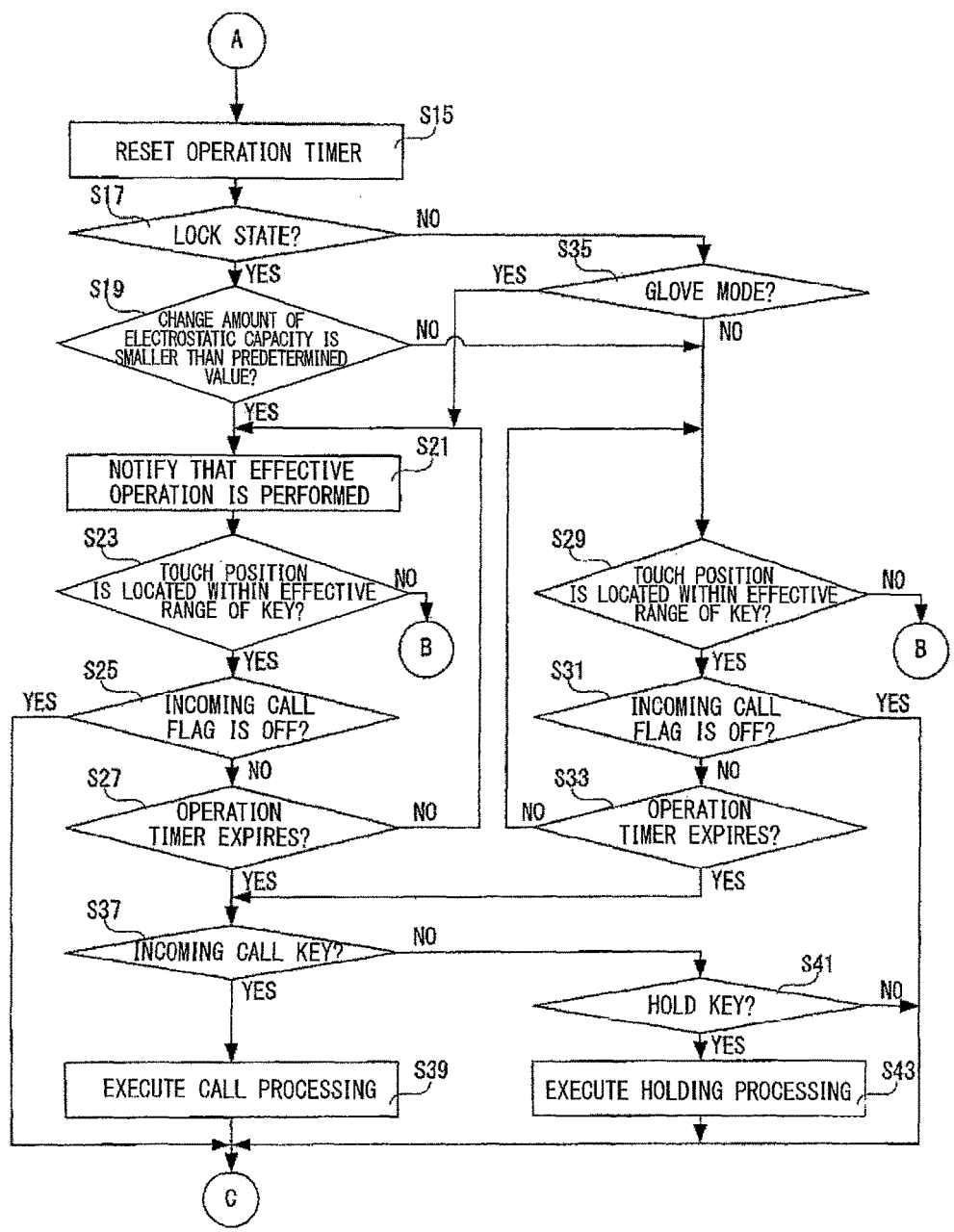
FIG. 12 is a flow chart showing an example of an incoming call control processing of a processor.

Next, the operation of the mobile phone 10 is described in detail using a memory map shown in FIG. 10 and flow charts shown in FIGS. 11 to 13.

With reference FIG. 10, the RAM 46 forms a program storage region 302 and a data storage region 304. The program storage region 302 is, as described above, a region to read out and then store (develop) part of or an entire program data which is preset in the flash memory 44 (FIG. 2).

The program storage region 302 stores a display control program 310 to turn off the power source of the display 14 and the touch panel 16 when the mobile phone 10 has not been operated for the predetermined length of time, an incoming call control program 312 to control the touch operation during the incoming call, a lock state control program 314 to unlock the lock state, and the like. The program storage region 302 also stores a program for a call request, a program to transmit and receive an E-mail, a program to manage an address book data, and the like.

Subsequently, in the data storage region 304 of the RAM 46, a touch buffer 330, a touch region buffer 332, and the like are provided, and a GUI data 334, a pop-up data 336, and the like are also stored. In the data storage region 304, a touch flag 338, a lock flag 340, a glove flag 342, an incoming call flag 344, an operation counter 346, and the like are also provided.

The touch buffer 330 temporarily stores data of a touch coordinate output by the touch panel control circuit 48, the change amount of the electrostatic capacity, data of a touch coordinate of a starting point and an ending point of the touch operation. The touch region buffer 332 temporarily stores data indicating a coordinate of the display range D and effective range E of the object.

The GUI data 334 is data of the GUI for displaying the lock screen, the incoming call screen, and the like. Thus, the GUI data 334 includes an image data, a text data, and the like. The pop-up data 336, which is data for displaying the pop-up 76, includes an image data and a text data as is the case with the GUI data 334.

The touch flag 338 is a flag to determine whether or not the touch panel 16 is touched. For example, the touch flag 338 is constituted by a 1-bit register. When the touch flag 338 is rendered ON (established), a data value "1" is set to the register. In contrast, when the touch flag 338 is rendered OFF (not established), a data value "0" is set to the register. The touch flag 338 is switched between ON and OFF in accordance with an output of the touch panel control circuit 48.

The lock flag 340 is a flag to determine whether or not the lock state is set. For example, the lock flag 340 is rendered ON when the lock state is set, and is rendered OFF when the lock state is unlocked. The glove flag 342 is a flag to determine whether or not the glove mode is set. The incoming call flag 344 is a flag to determine whether the incoming call arrives. For example, the incoming call flag 344 is rendered ON when the voice transmission signal is received, and is rendered OFF when the voice transmission signal cannot be received. The above flags have substantially the same configuration as the touch flag 338, so that the detailed description of the configuration of the above flags is omitted.

The operation counter 346 is a counter to measure the time of continuing the touch operation. The operation counter 346 is reset when the touch operation starts, and the measurement of the time starts. Then, the operation counter 346 expires when a predetermined time has passed in a state where the touch operation continues. For example, when the operation counter 346 expires, a predetermine processing (the call processing), for example, corresponding to the object such as the key is executed.

In the data storage region 304, the address book data is stored, and another flag and timer (counter) necessary for the execution of the program are also provided.

The processor 30 concurrently processes a plurality of tasks including an incoming call control processing shown in FIGS. 11 and 12, a lock state control processing shown in FIG. 13, and the like under control of a predetermined OS such as a Windows (R)-based OS, a Linux (R)-based OS such as Android (R), and iOS (R).

The processor 30 also processes, in parallel with the above processing, a display control processing of turning off the power source of the display 14 and the touch panel 16 when the mobile phone 10 has not been operated for the predetermined length of time. The display control processing is already known, so that the illustration and the description are omitted.

FIG. 11 is a part of a flow chart of the incoming call control processing. When the incoming flag 344 is rendered ON, the incoming control processing starts. In a step S1, the processor 30 displays an incoming call screen. For example, the display 14 displays an incoming call screen shown in FIG. 4. When the incoming call screen is displayed in the lock state, the sensitivity of the touch panel 16 is set relatively high to receive the operation with the glove on, as is the case that the lock screen is displayed. The processor 30 which executes the processing of the step S1 functions as a display processing module.

Subsequently, the processor 30 determines whether or not the touch operation is performed in a step S3. That is to say, the processor 30 determines whether the touch flag 338 is ON. When the determination result in the step S3 is "NO", that is to say, when the touch operation is not performed, the processor 30 determines whether or not the incoming flag 344 is OFF in a step S5. For example, the processor 30 determines whether the voice transmission signal is not received any more. When the determination result in the step S5 is "YES", that is to say, when voice transmission signal is not received any more and the incoming call flag 344 is rendered OFF, the processor 30 deletes the incoming call screen in a step S7. When the processing of the step S7 is completed, the processor 30 finishes the incoming call control processing.

Figure 9:
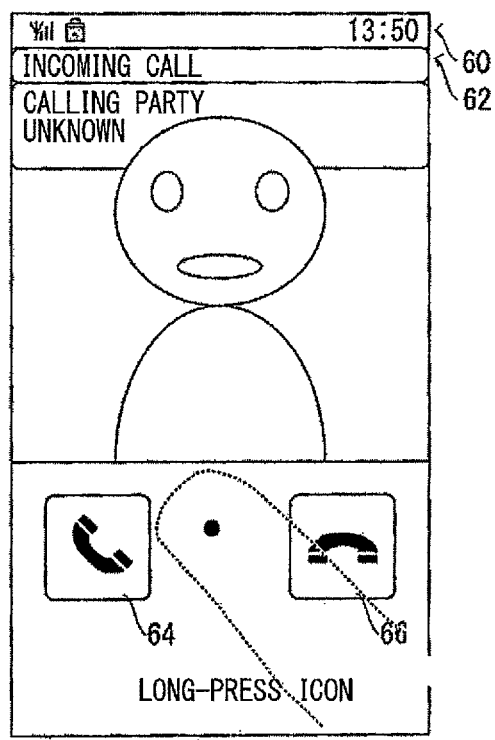
FIG. 9 is a graphic illustration showing an example of a state where an ineffective touch operation is performed on the incoming call key.

When the determination result in the step S5 is "NO", that is to say, when the incoming call flag 344 is still ON, the processor 30 returns to the processing of the step S3. When the determination result in the step S3 is "YES", that is to say, when the touch operation is performed on the incoming call screen, the processor 30 determines whether or not the touch position is located within the display range D of the key in a step S9. That is to say, it is determined whether the touch position is included in the display range D of either the incoming call key 64 or the hold key 66 based on data indicating a coordinate of the display range D of the incoming call key 64 and the hold key 66 stored in the touch region buffer 332 and the touch position (the gravity G) stored in the touch buffer 330. When the determination result in the step S9 is "NO", for example, when the touch position is not included in any display range D as shown in FIG. 9, the processor 30 returns to the processing of the step S3. When the touch operation is still performed in the state shown in FIG. 9, the processor 30 repeats the processing of the step S3 and step S9.

When the determination result in the step S9 is "YES", for example, when the touch position is included in the display range D of the incoming call key 64, the processor 30 determines whether or not the touch position is located within the effective range E of the key in a step S11. That is to say, it is determined whether the touch position is included in the effective range E of either the incoming call key 64 or the hold key 66 based on data indicating a coordinate of the effective range E of the incoming call key 64 and the hold key 66 stored in the touch region buffer 332 and the touch position stored in the touch buffer 330. The processor 30 which executes the processing of the step S11 functions as a first determination module.

When the determination result in the step S11 is "NO", for example, when the touch position is included in the display range D of the incoming call key 64 but is not included in the effective range E of the incoming call key 64, the processor 30 gives notice that the touch operation is not effective in a step S13. For example, as shown in FIG. 8, the display 14 displays the pop-up 76 which includes a message to notify that the touch operation is not effective. The processor 30 which executes the processing of the step S13 functions as a second notification module.

When the determination result in the step S11 is "YES", for example, when the touch position is included in the effective range E of the incoming call key 64, the processor 30 resets an operation timer in a step S15 shown in FIG. 12. That is to say, the operation counter 346 is reset to measure the time of continuing the touch operation. The processor 30 which executes the processing of the step S15 functions as a measuring module.

Subsequently, the processor 30 determines whether or not the lock state is set in a step S17. That is to say, it is determined whether the lock flag 340 is ON to determine whether the incoming call arrives in the lock state. When the determination result in the step S17 is "YES", that is to say, when the incoming call arrives in the lock state, the processor 30 determines whether or not the change amount of the electrostatic capacity is smaller than the predetermined value (the first threshold value) in a step S19. That is to say, it is determined whether the touch operation is performed with the gloved finger. Specifically, the processor 30 reads out the change amount of the electrostatic capacity stored in the touch buffer 330 to compare its value with the predetermined value (the first threshold value).

When the determination result in the step S19 is "YES", that is to say, when the touch operation is performed with the gloved hand, the processor 30 gives notice that the touch operation is effective in a step S21. For example, as shown in FIG. 6, the display 14 displays the pop-up 76 which includes a message to notify that the touch operation is effective. The time icon 78 is displayed in the pop-up 76 based on the time measured by the operation timer. The processor 30 changes the color of the incoming call key 64. The processor 30 which executes the processing of the step S21 functions as a first notification module.

Subsequently, the processor 30 determines whether or not the touch position is located within the effective range E of the key in a step S23. That is to say, it is determined whether the touch position changes in the long-tap operation and moves outside the effective range E. When the determination result in the step S23 is "NO", for example, when the touch position is located outside the effective range E, the processor 30 deletes the display of the pop-up 76 shown in FIG. 8, and then returns to the processing of the step S9. When the touch position is located within the display range D at the time of returning to the processing of the step S9, the processor 30 executes the steps S9 to S13, thereby giving notice that the touch operation is not effective. That is to say, when the touch position changes and moves outside the effective range E but is located within the display range D, the message included in the pop-up 76 changes from the content shown in FIG. 6 to the content shown in FIG. 8. Accordingly, the user can recognize that the touch operation enters the ineffective state in accordance with the message included in the pop-up 76. When the touch position moves outside the display range D, the pop-up 76 is deleted, so that the user can recognize that the touch operation enters the ineffective state.

When the determination result in the step S23 is "YES", that is to say, when the touch position is located within the effective range E, the processor 30 determines whether or not the incoming call flag 344 is OFF in a step S25. That is to say, it is determined whether there is no more incoming call state when the long-tap operation is performed. When the determination result in the step S25 is "YES", that is to say, when there is no more incoming call state, the processor 30 returns to the processing of the step S7, and when the processing of the step S7 is completed, the processor 30 finishes the incoming call control processing. In contrast, when determination result in the step S25 is "NO", that is to say, when the incoming call state continues, the processor 30 determines whether or not the operation timer expires in a step S27. That is to say, the processor 30 determines whether or not the predetermined time has passed in the state where the touch operation continues. When the determination result in the step S27 is "NO", that is to say, when the time measured by the operation timer does not reach the predetermined time, the processor 30 returns to the processing of the step S21. Subsequently, when the processing of the steps S21 to S27 is repeated, the state (the color) of the time icon 78 included in the pop-up 76 changes. In contrast, when the determination result in the step S27 is "YES", that is to say, when the time measured by the operation timer reaches the predetermined time, the processor 30 proceeds to the processing of a step S37.

When the determination result in the step S19 is "NO", that is to say, when the touch operation is performed with an ungloved hand, the processor 30 determines, in the similar manner to the step S23, whether or not the touch position is located within the effective range E of the key in a step S29. When the determination result in the step S29 is "NO", that is to say, when the touch position is not included in the effective range E of the key, the processor 30 returns to the processing of the step S9. When the determination result in the step S29 is "YES", that is to say, when the touch position is located within the effective range E, the processor 30 determines, in the similar manner to the step S25, whether or not the incoming call flag 344 is OFF in a step S31. When the determination result in the step S31 is "YES", that is to say, when the incoming call flag 344 is OFF, the processor 30 returns to the processing of the step S7. In contrast, when determination result in the step S31 is "NO", that is to say, when the incoming call flag 344 is ON, the processor 30 determines, in the similar manner to the step S27, whether or not the operation timer expires in a step S33. When the determination result in the step S33 is "NO", that is to say, when the operation timer does not expire, the processor 30 returns to the processing of the step S29. In contrast, when the determination result in the step S33 is "YES", that is to say, when the operation timer expires, the processor 30 proceeds to the processing of the step S37. That is to say, when the touch operation is performed with the ungloved hand (the bare hand), the processing of notifying that the touch operation is effective is not executed, however, another processing is performed in the similar manner to the case where the touch operation is performed with the gloved hand.

Herein, when the determination result in the step S17 is "NO", that is to say, when the incoming call arrives in the state where the lock state is unlocked, the processor 30 determines whether or not the glove mode is set in a step S35. That is to say, it is determined that the lock state is unlocked with the gloved hand. When the determination result in the step S35 is "YES", that is to say, when the glove flag 342 is ON and the glove mode is set, the processor 30 executes the processing of the steps S21 to S27. That is to say, the processing, which is executed when the touch operation is performed with the gloved hand, is executed. In contrast, when the determination result in the step S35 is "YES", that is to say, when the glove flag 342 is OFF and the normal mode is set, the processor 30 executes the processing of the steps S29 to S33. That is to say, the processing, which is executed when the touch operation is performed with the ungloved hand, is executed.

When the determination result in the step S27 or the step S33 is "YES", the processor 30 determines whether or not the incoming call key 64 is operated in the step S37. That is to say, when the predetermined time has passed after the effective long-tap operation is performed on either key, the processor 30 determines whether the key on which the long-tap operation is performed is the incoming call key 64. When the determination result in the step S37 is "YES", that is to say, when the long-tap operation is performed on the incoming call key 64, the processor 30 executes the call processing in a step S39. That is to say, the processing of the step S39 enables a telephone communication with the calling party. When the processing of the step S39 is completed, the processor 30 returns to the processing of the step S7. The processor 30 which executes the processing of the step S39 functions as a communication module.

In contrast, when determination result in the step S37 is "NO", that is to say, when the incoming call key 64 is not operated, the processor 30 determines whether or not the hold key 66 is operated in a step S41. That is to say, it is determined whether the long-tap operation is performed on the hold key 66. When the determination result in the step S41 is "NO", that is to say, when the long-tap operation is not performed on the hold key 66, the processor 30 returns to the processing of the step S7. When the determination result in the step S41 is "YES", that is to say, when the long-tap operation is performed on the hold key 66, the processor 30 executes the holding processing in a step S43. For example, a message notifying that the user cannot respond to the incoming call at this time over the telephone communication is transmitted to the telephone of the calling party. When the processing of the step S43 is completed, the processor 30 returns to the processing of the step S7.

The processor 30 which executes the processing of the step S19 or the step S35 functions as a second determination module. The processor 30 which executes the processing of the steps S39 and S43 functions as an execution module.

The processing of the step S17 and step S35 in the incoming call control processing may be omitted. That is to say, it is determined whether or not the glove is worn using the electrostatic capacity in the touch operation without determining whether the incoming call arrives in the lock state. When the step S17 and the step S35 are omitted, the processing of the step S19 is executed after the completion of the processing of the step S15.

FIG. 13 is a flow chart of the lock state control processing. For example, when the power source of the display 14 is turned on in the state where the lock state is set, the lock state control processing starts. In a step S61, the processor 30 displays the lock screen. That is to say, the display 14 displays the screen indicating the lock state. Subsequently, the processor 30 determines whether or not the unlock operation is performed in a step S63. That is to say, it is determined whether the operation of unlocking the lock state is performed. When the determination result in the step S63 is "NO", that is to say, when the operation of unlocking the lock state is not performed, the processor 30 determines whether or not the display is deleted in a step S65. For example, it is determined whether an operation or command of deleting the lock screen is provided. When the determination result in the step S65 is "YES", for example, when the power key 22b is operated, the processor 30 proceeds to a processing of a step S75. In contrast, when the determination result in the step S65 is "NO", that is to say, when the operation or command of deleting the lock screen is not provided, the processor 30 returns to the processing of the step S63.

When the determination result in the step S63 is "YES", that is to say, when the operation of unlocking the lock state is performed, the processor 30 renders the lock flag 340 OFF in a step S67. That is to say, the lock state is unlocked. Subsequently, the processor 30 determines, in the similar manner to the step S19, whether or not the change amount of the electrostatic capacity is smaller than the predetermined value (the first threshold value) in a step S69. When the determination result in the step S69 is "YES", that is to say, the unlock operation is performed with the gloved hand, the processor 30 renders the glove flag 342 ON in a step S71. That is to say, the glove mode is set. In contrast, when the determination result in the step S69 is "NO", that is to say, the unlock operation is performed with the ungloved hand, the processor 30 renders the glove flag 342 OFF in the step S73. That is to say, the normal mode is set.

When the glove flag 342 is rendered ON/OFF, the processor 30 deletes the lock screen in a step S75. That is to say, the lock state is unlocked, so that the lock screen is deleted to display a next screen (the home screen, for example). When the processing of the step S75 is completed, the processor 30 finishes the lock state control processing.

It is also applicable to give notice that the touch operation is effective not only on the incoming call key 64 but also on a key in another screen. It is also applicable to give notice that not only the long-tap operation but also the tap operation and the swipe operation, for example, is effective as the touch operation.

Although FIG. 6, for example, illustrates that the pop-up 76 is displayed when the touch operation on the incoming call key 64 is effective, the image of the incoming call key 64 may be made larger along with the display of the pop-up 76, or the image of the incoming call key 64 may be larger instead of displaying the pop-up 76.

It is also applicable to display only the time icon 78 in the information included in the pop-up 76 of FIG. 6 when the image of the incoming call key 64 is made larger.

It is also applicable to change the color of the image of the incoming call key 64 in accordance with the lapse of time of continuing the touch operation when the image of the incoming call key 64 is made larger instead of displaying the pop-up 76.

It is also applicable to execute the predetermined processing based on not the long-tap operation but the tap operation and the flick operation, for example, other than the long-tap operation when the image of the incoming call key 64 is made larger instead of displaying the pop-up 76.

The user may arbitrarily set the glove mode and the normal mode. Moreover, when the glove mode is set, an icon indicating that the glove mode is set may be displayed on the state display region 60. The glove mode may always be set.

A rejection processing, for example, may be executed as the predetermined processing which is executable during the incoming call. For example, when the rejection processing is executed, the voice transmission processing executed by the telephone of the calling party is finished. The incoming call screen may display an object (a rejection key, for example) corresponding to the above rejection processing instead of the hold key 66. The incoming call screen may display the rejection key in addition to the incoming call key 64 and the hold key 66.

In the processing described in the flow charts, the steps are repeatedly performed at a constant interval (for example, a time shorter than one second), however, the steps may be repeated at a longer interval than the constant interval.

Although the term of "larger than" is used with respect to the threshold value (the predetermined value, for example), the term of "larger than the threshold value" includes a meaning of "equal to or larger than the threshold value". The term of "smaller than the threshold value" includes meanings of "equal to or smaller than the threshold value" and "smaller than the threshold value".

The program used in the mobile phone 10 may be stored in a HDD of a data distribution server to be distributed to the mobile phone 10 via networks. Moreover, a storage medium which stores the plurality of programs may be manufactured or distributed. The storage medium is for example, an optical disc such as CD, DVD, and BD (Blue-Ray Disk), a USB memory, and a memory card. When the program downloaded via the above server, the storage medium, and the like is installed on a mobile phone having a configuration equivalent to the mobile phone 10, the effect equivalent to the mobile phone 10 may be obtained.

Each of the concrete numerical values described in the detailed description is merely one example, so that the numerical values may be appropriately changed in accordance with a specification change.

The mobile phone 10 has been described in detail, but the above-mentioned description is illustrative in all aspects and the present disclosure is not intended to be limited thereto. The above modification examples may be applied in combination in so far as they are mutually consistent. Various modifications not exemplified are construed to be made without departing from the scope of the present disclosure.

The invention claimed is:

1. A mobile communication terminal, comprising:
  a display;
  a touch panel configured to be located on the display and have sensitivity to a touch operation being able to set relatively high or low; and
  at least one processor configured to display an object on the display in response to an incoming call, configured to determine whether a touch operation on the object is effective, configured to determine whether a touch operation is performed in a first state where the sensitivity of the touch panel is set relatively high, configured to give notice that a first touch operation on the object is effective when the at least one processor determines that the first touch operation is effective and the first touch operation is performed in the first state, and configured to execute a predetermined processing when a predetermined time has passed in a state where the first touch operation continues.

2. The mobile communication terminal according to claim 1, wherein
  the at least one processor is configured to display a pop-up on the display when the at least one processor determines that the first touch operation is effective and the first touch operation is performed in the first state.

3. The mobile communication terminal according to claim 1, wherein
  the at least one processor is configured to start measuring a time when the at least one processor determines that the first touch operation is effective and the first touch operation is performed in the first state, and
  the at least one processor gives notice that the first touch operation is effective together with the time.

4. The mobile communication terminal according to claim 1, wherein
  the at least one processor is configured to give notice that a second touch operation on the object is not effective when the at least one processor determines that the second touch operation is not effective.

5. The mobile communication terminal according to claim 1, wherein
  the at least one processor is configured to execute a call processing.

6. A non-transitory computer readable recording medium that stores an incoming call control program for causing at least one processor of a mobile communication terminal which comprises a display and a touch panel, which is configured to be located on the display and have sensitivity to a touch operation being able to set relatively high or low, to execute:
  a display processing step of displaying an object on the display in response to an incoming call;
  a first determination step of determining whether a touch operation on the object is effective;

a second determination step of determining whether a touch operation is performed in a state where the sensitivity of the touch panel is set relatively high;

a notification step of giving notice that, when it is determined in the first determination step that a touch operation on the object is effective and it is determined in the second determination step that the touch operation is performed in a state where the sensitivity of the touch panel is set relatively high, the touch operation is effective; and an execution step of executing a predetermined processing when a predetermined time has passed in a state where the touch operation continues.

7. An incoming call control method of causing at least one processor of a mobile communication terminal which comprise a display and a touch panel, which is configured to be located on the display and have sensitivity to the touch operation being able to set relatively high or low, to execute:

a display processing step of displaying an object on the display in response to an incoming call;

a first determination step of determining whether the touch operation on the object is effective;

a second determination step of determining whether the touch operation is performed in a state where the sensitivity of the touch panel is set relatively high;

a notification step of notifying that, when it is determined in the first determination step that a touch operation on the object is effective and it is determined in the second determination step that the touch operation is performed in a state where the sensitivity of the touch panel is set relatively high, the touch operation is effective; and an execution step of executing a predetermined processing when a predetermined time has passed in a state where the touch operation continues.

* * * * *